(12) United States Patent
Uensal et al.

(10) Patent No.: US 8,273,277 B2
(45) Date of Patent: Sep. 25, 2012

(54) PROCESS FOR PRODUCING A PROTON-CONDUCTING, POLYAZOLE-CONTAINING MEMBRANE

(75) Inventors: Oemer Uensal, Mainz (DE); Mathias Weber, Rüsselsheim (DE); Gunter Christ, Hünstetten (DE); Christian Dörr, Eppstein (DE); Daniel Walczyk, Troy, NY (US); Tequila Harris, Troy, NY (US)

(73) Assignee: BASF Fuel Cell GmbH (DE)

( * ) Notice: Subject to any disclaimer, the term of this patent is extended or adjusted under 35 U.S.C. 154(b) by 482 days.

(21) Appl. No.: 12/440,968

(22) PCT Filed: Sep. 11, 2007

(86) PCT No.: PCT/EP2007/007896
§ 371 (c)(1),
(2), (4) Date: Oct. 30, 2009

(87) PCT Pub. No.: WO2008/031554
PCT Pub. Date: Mar. 20, 2008

(65) Prior Publication Data
US 2010/0181697 A1 Jul. 22, 2010

(30) Foreign Application Priority Data
Sep. 12, 2006 (DE) .......................... 10 2006 042 760

(51) Int. Cl.
B28B 3/20 (2006.01)
(52) U.S. Cl. .................................................... 264/176.1
(58) Field of Classification Search ................. 264/176.1
See application file for complete search history.

(56) References Cited

U.S. PATENT DOCUMENTS

| | | | |
|---|---|---|---|
| 3,692,569 | A | 9/1972 | Grot |
| 4,453,991 | A | 6/1984 | Grot |
| 5,422,411 | A | 6/1995 | Wei et al. |
| 6,096,856 | A | 8/2000 | Helmer-Metzmann et al. |
| 6,110,616 | A | 8/2000 | Sheikh-Ali et al. |
| 6,790,931 | B2 | 9/2004 | Cui et al. |
| 2003/0013817 | A1 | 1/2003 | Lu |
| 2005/0053820 | A1 | 3/2005 | Calundann et al. |
| 2005/0147859 | A1 | 7/2005 | Kiefer et al. |
| 2006/0008690 | A1 | 1/2006 | Uensal et al. |
| 2006/0078774 | A1* | 4/2006 | Uensal et al. ................... 429/33 |
| 2006/0183012 | A1 | 8/2006 | Uensal et al. |

FOREIGN PATENT DOCUMENTS

| | | |
|---|---|---|
| DE | 19527435 A1 | 1/1997 |
| DE | 19959289 A1 | 6/2001 |
| DE | 10213540 A1 | 2/2004 |
| DE | 10246459 A1 | 4/2004 |
| DE | 10246461 A1 | 4/2004 |
| DE | 10144815 A1 | 1/2005 |
| EP | 1657274 A1 | 5/2006 |
| WO | WO-96/01177 A1 | 1/1996 |
| WO | WO-96/13872 A1 | 5/1996 |
| WO | WO-2004034499 A2 | 4/2004 |

* cited by examiner

*Primary Examiner* — Larry Thrower
(74) *Attorney, Agent, or Firm* — Connolly Bove Lodge & Hutz LLP

(57) ABSTRACT

A method for producing a proton-conducting, polyazole-containing membrane, in which
A) a composition containing polyphosphoric acid and at least one polyazole and exhibiting a solution viscosity in the range from 10 Pa·s to 1000 Pa·s, measured to DIN 53018 at the temperature at the orifice during production of the membrane, is pressed through an orifice at a temperature in the range from 25° C. to 300° C., and
B) the composition is then solidified.

16 Claims, No Drawings

PROCESS FOR PRODUCING A PROTON-CONDUCTING, POLYAZOLE-CONTAINING MEMBRANE

CROSS-REFERENCE TO RELATED APPLICATIONS

Related Applications

This application is a national stage application (under 35 U.S.C. §371) of PCT/EP2007/007896, filed Sep. 11, 2007, which claims benefit of German application 10 2006 042760.2, filed Sep. 12, 2006.

BACKGROUND OF THE INVENTION

The present invention relates to a method for producing a proton-conducting, polyazole-containing membrane.

Polymer electrolyte membranes (PEM) are already known and, in particular, are used in fuel cells. Sulfonic acid-modified polymers, in particular perfluorinated polymers, are often used for this purpose. One prominent example of these is Nafion™ from DuPont de Nemours, Willmington USA. Proton conduction entails a relatively high water content in the membrane, typically amounting to 4-20 molecules of water per sulfonic acid group. Not only the necessary water content, but also the stability of the polymer in conjunction with acidic water and the reaction gases hydrogen and oxygen, conventionally limit the operating temperature of the PEM fuel cell stack to 80-100° C. Under pressure, operating temperatures can be raised to >120° C. Otherwise, higher operating temperatures cannot be achieved without a drop in fuel cell performance.

However, for systems engineering reasons operating temperatures of higher than 100° C. in the fuel cell are desirable. The activity of the noble metal-based catalysts present in the membrane-electrode unit (MEU) is substantially better at elevated operating temperatures. In particular when hydrocarbon "reformates" are used, the reformer gas contains considerable quantities of carbon monoxide which conventionally have to be removed by complex gas preparation or purification. The tolerance of the catalysts to CO contamination increases at elevated operating temperatures.

Furthermore, heat arises during fuel cell operation. However, cooling these systems to below 80° C. may be very expensive. Depending on power output, the cooling devices may be of substantially simpler design. That means that, in fuel cell systems which are operated at temperatures of above 100° C., the waste heat is distinctly more readily utilisable and efficiency of the fuel cell system can be increased by combined heat and power generation.

Membranes with new conductivity mechanisms are generally used to achieve these temperatures. One approach is to use membranes which exhibit electrical conductivity without the use of water. The first promising development in this direction is presented in publication WO 96/13872. This in particular proposes using acid-doped polybenzimidazole membranes which are produced by casting.

Documents DE 102 46 459 A1, DE 102 46 461 A1 and DE 102 13 540 A1 describe further developments of this type of membrane.

DE 102 46 461 A1 discloses proton-conducting polymer membranes which are obtainable by a method which comprises the steps:
A) producing a mixture comprising polyphosphoric acid, at least one polyazole (polymer A) and/or at least one or more compound(s) which, on exposure to heat according to step B), is/are suitable for forming polyazoles,
B) heating the mixture obtainable according to step A) under inert gas to temperatures of up to 400° C.,
C) applying a layer using the mixture according to step A) and/or B) onto a support,
D) treating the membrane formed in step C) until it is self-supporting,
wherein at least one further polymer (polymer B), which is not a polyazole, is added to the composition obtainable according to step A) and/or step B), the weight ratio of polyazole to polymer B being in the range from 0.1 to 50.

DE 102 46 459 A1 relates to proton-conducting polymer membranes based on polyazoles containing phosphonic acid groups which are obtained by a method which comprises the steps:
A) mixing one or more aromatic and/or heteroaromatic tetra-amino compounds with one or more aromatic and/or heteroaromatic carboxylic acids or the derivatives thereof which contain at least two acid groups per carboxylic acid monomer, wherein at least a proportion of the tetra-amino compounds and/or of the carboxylic acids comprises at least one phosphonic acid group, or mixing one or more aromatic and/or heteroaromatic diaminocarboxylic acids, at least a proportion of which comprises phosphonic acid groups, in polyphosphoric acid, to form a solution and/or dispersion,
B) heating the solution and/or dispersion obtainable according to step A) under inert gas to temperatures of up to 350° C. while forming polyazole polymers,
C) applying a layer using the mixture according to step A) and/or B) onto a support,
D) treating the membrane formed in step C) until it is self-supporting.

DE 102 13 540 A1 relates to proton-conducting polymer membranes based on polyvinylphosphonic acid which are obtainable by a method which comprises the steps:
A) dissolving a polymer, in particular a polyazole, in phosphonic acid containing vinyl,
B) forming a planar structure using the solution according to step A) on a support
C) applying a starter solution onto the planar structure formed according to step B) and
D) polymerising the vinylphosphonic acid present in the planar structure according to step C).

In these methods, it is intended for the planar structure to be formed [step C) in DE 102 46 461 A1, step C) in DE 102 46 459 A1, step B) in DE 102 13 540 A1] by means of per se known measures, such as for example casting, spraying, knife coating, extrusion, which are known from the prior art for polymer film production. However, no further indications as to the exact procedure are to be inferred from the documents.

Producing the above membranes by casting, spraying or knife coating is unfortunately very complex and costly. It requires the use of large quantities of solvent to dissolve and apply the polymer onto the support, which solvent must subsequently be removed and recovered. The method is furthermore very time-consuming and permits only a low space-time yield. The fluctuations in quality which are frequently to be observed between different production batches constitute an additional problem. Furthermore, processing polyazoles with comparatively high molecular weights is particularly difficult due to the relatively poor solubility of these polymers, the increasing non-uniformity of the corresponding solutions and the increasing formation of bubbles.

Extruding the mixtures to form the corresponding planar structures is also non-trivial. The problem in particular arises that, due to the comparatively high temperatures, the polyazoles continue to condense, so forming polymers with ever higher molecular weights, whereby the properties of the polymers and the membranes, if they can even be obtained, are significantly impaired. Furthermore, due to the high molecular weight, processing of the polyazoles becomes increasingly difficult, such that in many cases membranes can no longer even be obtained. It is at present not possible to produce membranes with high levels of quality and reproducibility.

BRIEF SUMMARY OF THE INVENTION

The object of the present invention was accordingly to provide an improved method for producing a proton-conducting, polyazole-containing membrane which does not exhibit the above disadvantages and permits membranes to be produced in the simplest possible manner inexpensively and on a large industrial scale. In particular, the method should
  require the least possible solvent,
  permit production of the membranes with an improved space-time yield,
  give rise to membranes of the highest possible quality and slightest possible batch-to-batch variation,
  allow the processing of polyazoles with comparatively high molecular weights and
  as far as possible prevent the formation of bubbles in the membrane.

These objects are achieved by a method having all the features of claim 1.

The present invention accordingly provides a method for producing a proton-conducting, polyazole-containing membrane, in which A) a composition containing polyphosphoric acid and at least one polyazole and exhibiting a solution viscosity in the range from 10 Pa·s to 1000 Pa·s, measured to DIN 53018 at the temperature at the orifice during production of the membrane, is pressed through an orifice at a temperature in the range from 25° C. to 300° C., and B) the composition is then solidified.

DETAILED DESCRIPTION OF THE INVENTION

The phosphoric acid used comprises conventional commercial polyphosphoric acid, as is for example obtainable from Riedel-de Haen. Polyphosphoric acid $H_{n+2}P_nO_{3n+1}$ (n>1) conventionally has a content, calculated (acidimetrically) as $P_2O_5$, of at least 83%.

The polyazole preferably contains azole repeat units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

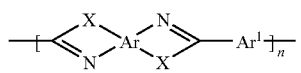

(I)

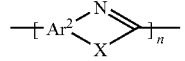

(II)

-continued

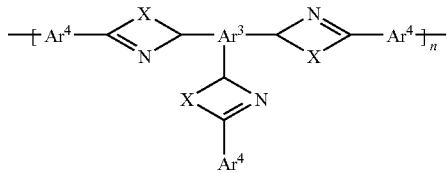

(III)

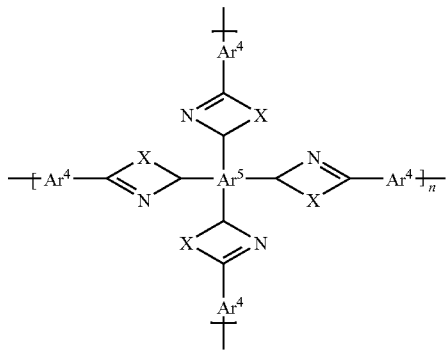

(IV)

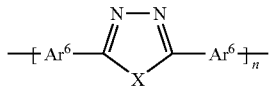

(V)

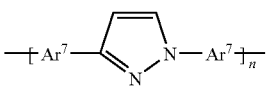

(VI)

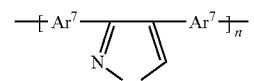

(VII)

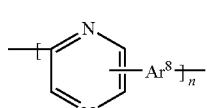

(VIII)

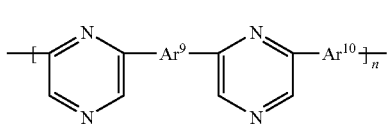

(IX)

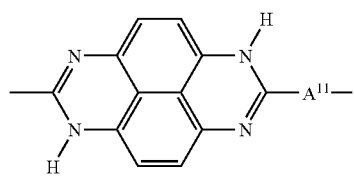

(X)

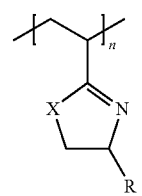

(XI)

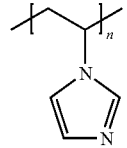

(XII)

(XIII) 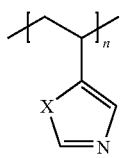

(XIV) 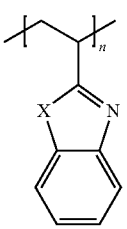

(XV) 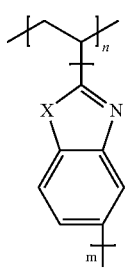

(XVI) 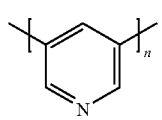

(XVII) 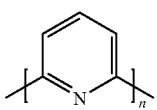

(XVIII) 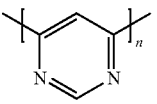

(XIX) 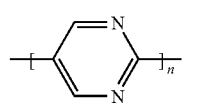

(XX) 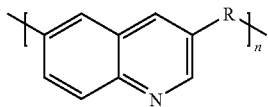

(XXI) 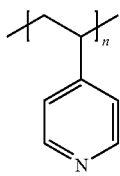

(XXII) 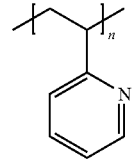

in which
Ar are identical or different and denote a tetravalent aromatic or heteroaromatic group, which may be mono- or polynuclear, $Ar^1$ are identical or different and denote a divalent aromatic or heteroaromatic group, which may be mono- or polynuclear, $Ar^2$ are identical or different and denote a di- or trivalent aromatic or heteroaromatic group, which may be mono- or polynuclear, $Ar^3$ are identical or different and denote a trivalent aromatic or heteroaromatic group, which may be mono- or polynuclear, $Ar^4$ are identical or different and denote a trivalent aromatic or heteroaromatic group, which may be mono- or polynuclear, $Ar^5$ are identical or different and denote a tetravalent aromatic or heteroaromatic group, which may be mono- or polynuclear, $Ar^6$ are identical or different and denote a divalent aromatic or heteroaromatic group, which may be mono- or polynuclear, $Ar^7$ are identical or different and denote a divalent aromatic or heteroaromatic group, which may be mono- or polynuclear, $Ar^8$ are identical or different and denote a trivalent aromatic or heteroaromatic group, which may be mono- or polynuclear, $Ar^9$ are identical or different and denote a di- or tri- or tetravalent aromatic or heteroaromatic group, which may be mono- or polynuclear, $Ar^{10}$ are identical or different and denote a di- or trivalent aromatic or heteroaromatic group, which may be mono- or polynuclear, $Ar^{11}$ are identical or different and denote a divalent aromatic or heteroaromatic group, which may be mono- or polynuclear, X is identical or different and denotes oxygen, sulfur or an amino group, which bears a hydrogen atom, a group comprising 1-20 carbon atoms, preferably a branched or unbranched alkyl or alkoxy group, or an aryl group as a further residue R in all the formulae apart from formula (XX) identically or differently denotes hydrogen, an alkyl group or an aromatic group and in formula (XX) denotes an alkylene group or an aromatic group and n, m is an integer greater than or equal to 10, preferably greater than or equal to 100.

Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotriazole, benzoxathiadiazole, benzoxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

The substitution pattern of $Ar^1$, $Ar^4$, $Ar^6$, $Ar^7$, $Ar^8$, $Ar^9$, $Ar^{10}$, $Ar^{11}$ is here at random, for example in the case of phenylene $Ar^1$, $Ar^4$, $Ar^6$, $Ar^7$, $Ar^8$, $Ar^9$, $Ar^{10}$, $Ar^{11}$ may be ortho-, meta- and para-phenylene. Particularly preferred groups are derived from benzene and biphenylene, which may optionally also be substituted.

Preferred alkyl groups are short-chain alkyl groups with 1 to 4 carbon atoms, such as for example methyl, ethyl, n- or i-propyl and t-butyl groups.

Preferred aromatic groups are phenyl or naphthyl groups. The alkyl groups and the aromatic groups may be substituted.

Preferred substituents are halogen atoms such as for example fluorine, amino groups, hydroxyl groups or short-chain alkyl groups, such as for example methyl or ethyl groups.

Preferred polyazoles are those with repeat units of the formula (I) in which the residues X are identical within one repeat unit.

The polyazoles may in principle also comprise different repeat units which differ, for example, in their residue X. Preferably, however, only identical residues X are present in one repeat unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

In a further embodiment of the present invention, the polyazole is a copolymer which contains at least two units of the formula (I) to (XXII) which differ from one another. The polymers may also assume the form of block copolymers (diblock, triblock), random copolymers, periodic copolymers and/or alternating polymers.

In a particularly preferred embodiment of the present invention, the polyazole is a homopolymer which contains only units of the formula (I) and/or (II).

The number of azole repeat units in the polymer is preferably an integer greater than or equal to 10. Particularly preferred polymers contain at least 100 azole repeat units.

Polymers containing benzimidazole repeat units are preferred for the purposes of the present invention. Some examples of the highly convenient polymers containing benzimidazole repeat units are represented by the following formulae:

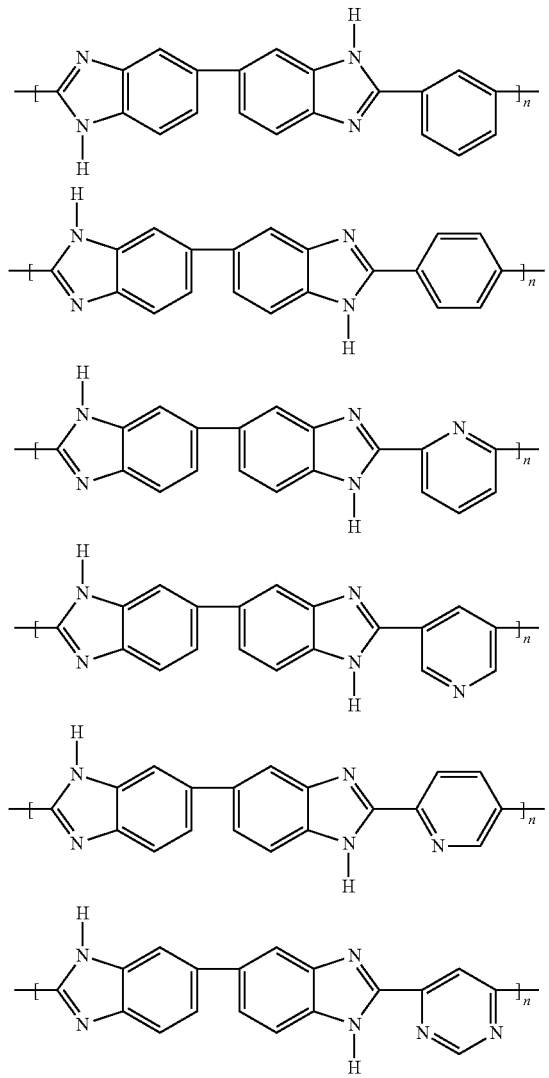

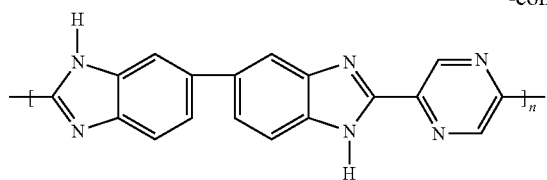
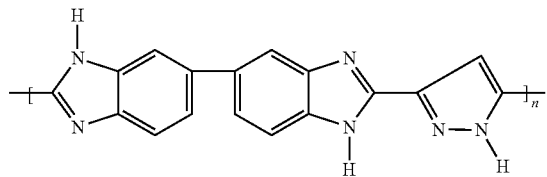
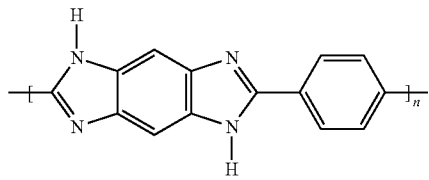
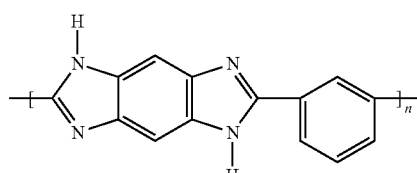
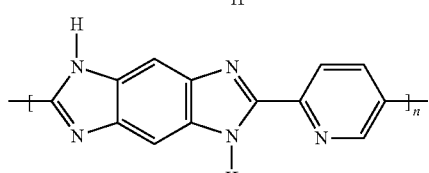
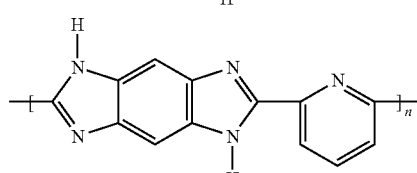
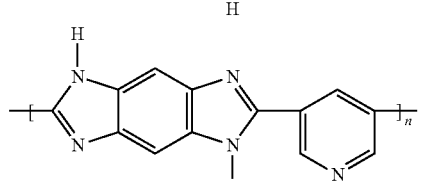
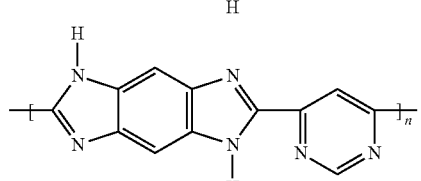
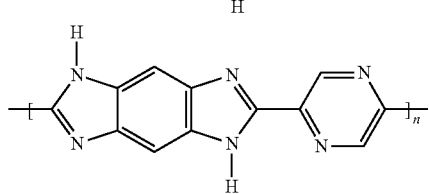

-continued

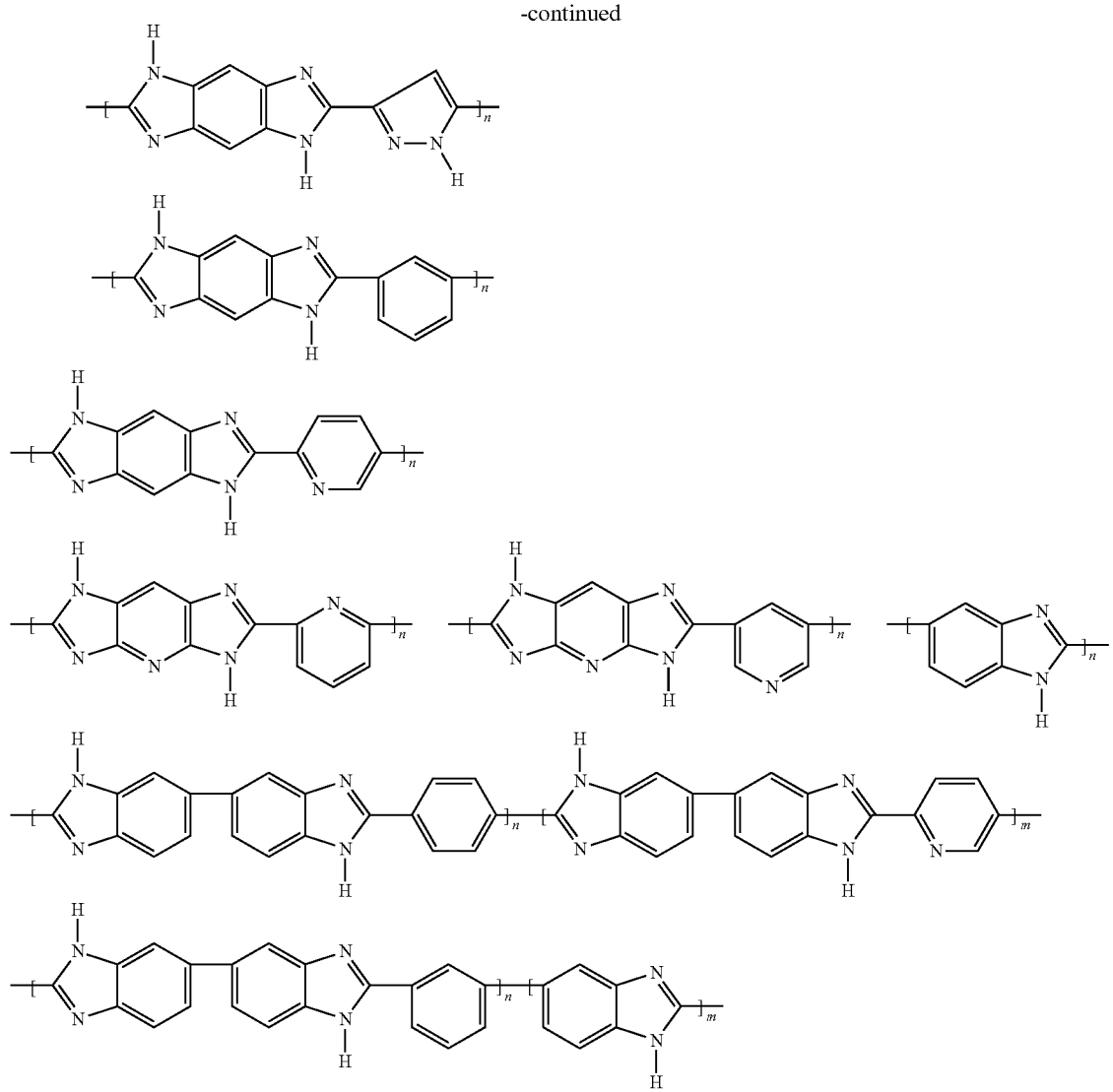

wherein n and m are integers greater than or equal to 10, preferably greater than or equal to 100.

For the purposes of a particularly preferred variant of the present invention, the polyazoles comprise at least one sulfonic and/or phosphonic acid group. Such polymers are described in document DE 102 46 459 A1, the disclosure of which is hereby incorporated by reference.

The polyazoles used, but in particular the polybenzimidazoles, are distinguished by an elevated molecular weight. Measured as intrinsic viscosity, this amounts to at least 0.2 dl/g, preferably 0.8 to 10 dl/g, in particular 1 to 10 dl/g.

Preferred polybenzimidazoles are commercially available under the trade name 0 Celazole.

According to one particularly preferred variant of the method according to the invention, the polyazoles are produced in situ. To this end, one or more compounds which, on exposure to heat, are capable of forming polyazoles may be added the polyphosphoric acid.

Suitable mixtures are in particular those which comprise one or more aromatic and/or heteroaromatic tetra-amino compounds and one or more aromatic and/or heteroaromatic carboxylic acids or the derivatives thereof comprising at least two acid groups per carboxylic acid monomer. One or more aromatic and/or heteroaromatic diaminocarboxylic acids may moreover be used for producing polyazoles.

The aromatic and heteroaromatic tetra-amino compounds include, inter alia 3,3',4,4'- tetraminobiphenyl, 2,3,5,6-tetraminopyridine, 1,2,4,5- tetraminobenzene, 3,3',4,4'- tetraminodiphenyl sulfone, 3,3',4,4'- tetraminodiphenyl ether, 3,3',4,4'-tetraminobenzophenone, 3,3',4,4'-tetraminodiphenylmethane and 3,3',4,4'- tetramino diphenyldimethyl methane and the salts thereof, in particular the mono-, di-, tri- and tetrahydrochloride derivatives thereof. Of these, 3,3',4,4'-tetraminobiphenyl, 2,3,5,6-tetraminopyridine and 1,2,4,5-tetraminobenzene, are particularly preferred.

The mixture may moreover comprise aromatic and/or heteroaromatic carboxylic acids. These comprise dicarboxylic acids and tricarboxylic acids and tetracarboxylic acids or the esters thereof or the anhydrides thereof or the acid halides thereof, in particular the acid halides and/or acid bromides thereof. The aromatic dicarboxylic acids preferably comprise isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenyl sulfone-4,4'-dicarboxylic acid, biphenyl-4,4'-dicarboxylic acid, 4-trifluoromethylphthalic acid, 2,2-bis(4-carboxyphenyl) hexafluoropropane, 4,4'-stilbenedicarboxylic acid, 4-carboxycinnamic acid, or the C1-C20 alkyl esters or C5-C12 aryl esters thereof, or the acid anhydrides thereof or the acid chlorides thereof.

The aromatic tricarboxylic acids or the C1-C20 alkyl esters or C5-C12 aryl esters thereof or the acid anhydrides thereof or the acid chlorides thereof preferably comprise 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids or the C1-C20 alkyl esters or C5-C12 aryl esters thereof or the acid anhydrides thereof or the acid chlorides thereof preferably comprise 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids preferably comprise heteroaromatic dicarboxylic acids and tricarboxylic acids and tetracarboxylic acids or the esters thereof or the anhydrides thereof. Heteroaromatic carboxylic acids are taken to be aromatic systems which contain at least one nitrogen, oxygen, sulfur or phosphorus atom in the aromatic moiety. They preferably comprise pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid together with the C1-C20 alkyl esters or C5-C12 aryl esters thereof, or the acid anhydrides thereof or the acid chlorides thereof.

The content of tricarboxylic acid or tetracarboxylic acids (relative to the introduced dicarboxylic acid) amounts to between 0 and 30 mol %, preferably 0.1 and 20 mol %, in particular 0.5 and 10 mol %.

Aromatic and heteroaromatic diaminocarboxylic acids may furthermore also be used. These include inter alia diaminobenzoic acid, 4-phenoxycarbonyl-3,'4'-diaminodiphenyl ether and the mono- and dihydrochloride derivatives thereof.

Preferably, mixtures of at least 2 different aromatic carboxylic acids are used. Mixtures which are particularly preferably used are those which, in addition to aromatic carboxylic acids, also contain heteroaromatic carboxylic acids. The mixing ratio of aromatic carboxylic acids to heteroaromatic carboxylic acids amounts to between 1:99 and 99:1, preferably between 1:50 to 50:1.

These mixtures in particular comprise mixtures of N-heteroaromatic dicarboxylic acids and aromatic dicarboxylic acids. Non-limiting examples of dicarboxylic acids are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenyl sulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

If a molecular weight which is as high as possible is to be achieved, the molar ratio of carboxylic acid groups to amino groups during the reaction of tetra-amino compounds with one or more aromatic carboxylic acids or the esters thereof, which contain at least two acid groups per carboxylic acid monomer, is preferably in the vicinity of 1:2.

Preferably at least 0.5 wt. %, in particular 1 to 30 wt. % and particularly preferably 2 to 15 wt. % of monomers are used to produce polyazoles, in each case relative to the resultant weight of the composition to be used.

If the polyazoles are produced from the monomers directly in the polyphosphoric acid, the polyazoles are distinguished by an elevated molecular weight. This is particularly the case for polybenzimidazoles. Measured as intrinsic viscosity, this is in the range from 0.3 to 10 dl/g, preferably in the range from 1 to 5 dl/g.

Where tricarboxylic acids or tetracarboxylic acid are also used, they give rise to branching/crosslinking of the resultant polymers. This contributes an improvement in mechanical properties.

According to a further aspect of the present invention, compounds are used which, on exposure to heat, are suitable for forming polyazoles, wherein these compounds are obtainable by reacting one or more aromatic and/or heteroaromatic tetra-amino compounds with one or more aromatic and/or heteroaromatic carboxylic acids or the derivatives thereof, which contain at least two acid groups per carboxylic acid monomer, or one or more aromatic and/or heteroaromatic diaminocarboxylic acids in a melt at temperatures of up to 400° C., in particular of up to 350° C., preferably of up to 280° C. The compounds to be used for producing these prepolymers have been explained above.

In principle, no restrictions apply to the particular proportions of the polyphosphoric acid and the polyazole. Compositions which are particularly suitable for the purposes of the present invention contain, in each case relative to the total weight (initial weight) thereof, 70.0 wt. % to 99.999 wt. %, preferably 90.0 wt. % to 99.9 wt. %, particularly preferably 95.0 wt. % to 99.5 wt. %, of polyphosphoric acid and 30.0 wt. % to 0.001 wt. %, preferably 10.0 wt. % to 0.1 wt. %, particularly preferably 5.0 wt. % to 0.5 wt. %, of polyazole.

The composition to be used in the present method preferably assumes the form of a dispersion, suspension or solution and may optionally comprise a low solid content and/or gel content. Particularly preferably, however, the proportion of constituents which can be filtered out is less than 30.0 wt. %, preferably less than 10.0 wt. %, in particular less than 5.0 wt. %, in each case relative to the total weight of the composition. Determination of the quantities which can be filtered out here favourably proceeds at the temperature at which the method according to the invention is carried out (temperature at the orifice). Furthermore, screens with screen openings (mesh) preferably of less than 1.0 mm, preferably of less than 500 μm, particularly preferably of less than 100 μm, are used.

The composition to be used in the method exhibits a solution viscosity in the range from 10 Pa·s to 1000 Pa·s, preferably in the range from 20 Pa·s to 800 Pa·s, particularly preferably in the range from 30 Pa·s to 600 Pa·s, in particular in the range from 50 Pa·s to 500 Pa·s. Solution viscosity is measured according to DIN 53018 at a shear rate of 30 Hz between two 20 mm plates. Viscosity is measured at the temperature which corresponds to the temperature at the orifice during production of the membrane.

The polyazole in the composition furthermore favourably exhibits an intrinsic viscosity (IV) in at least 96% sulfuric acid of 0.3 to 10, particularly preferably of 1 to 5. The intrinsic viscosity may here be determined in per se known manner by measuring concentration series and extrapolating to infinite dilution. The measurements are preferably made at a temperature of between 0° C. and 100° C., particularly preferably of between 20° C. and 80° C., in particular at 25° C. It has furthermore proved particularly effective to use Ostwald viscosimeters and/or Ubbelohde viscosimeters.

Further information regarding viscosity parameters and the associated determination methods may be found in the usual specialist literature, for example Ullmann 1, 67-85; (4th ed.) 5, 755-778, the disclosure of which is hereby incorporated by reference.

For the purposes of a highly preferred variant of the present invention, the composition to be used furthermore contains at least one polymer which is not a polyazole (polymer B). These polymers may inter alia assume dissolved, dispersed or suspended form.

The weight ratio of polyazole to polymer (B) is here preferably in the range from 0.1 to 50, preferentially in the range from 0.2 to 20, particularly preferably in the range from 1 to 10. If the polyazole is formed in situ, the weight ratio may be obtained by calculation from the weight of the monomers for forming the polyazole, wherein the compounds, for example water, liberated during condensation must be taken into account.

Preferred polymers include inter alia polyolefins, such as poly(chloroprene), polyacetylene, polyphenylene, poly(p-xylylene), polyarylmethylene, polyarmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene, polyhexafluoropropylene, copolymers of PTFE with hexafluoropropylene, with perfluoropropyl vinyl ether, with trifluoronitrosomethane, with sulfonyl fluoride vinyl ether, with carbalkoxyperfluoroalkoxy vinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular prepared from norbornene; polymers with C—O bonds in the main chain, for example polyacetal, polyoxymethylene, polyether, polypropylene oxide, polyepichlorohydrin, polytetrahydrofuran, polyphenylene oxide, polyether ketone, polyester, in particular polyhydroxyacetic acid, polyethylene terephthalate, polybutylene terephthalate, polyhydroxy benzoate, polyhydroxypropionic acid, polypivalolactone, polycaprolactone, polymalonic acid, polycarbonate; polymers with C—S bonds in the main chain, for example polysulfide ethers, polyphenylene sulfide, polyether sulfone; polymers with C—N bonds in the main chain, for example polyimines, polyisocyanides, polyether imine, polyaniline, polyamides, polyhydrazides, polyurethanes, polyimides, polyazoles, polyazines;

liquid crystal polymers, in particular Vectra and inorganic polymers, for example polysilanes, polycarbosilanes, polysiloxanes, polysilicic acid, polysilicates, silicones, polyphosphazenes and polythiazyl.

Moreover, polymers with covalently attached acid groups are also among preferred polymers (B). These acid groups in particular comprise sulfonic acid groups. The polymers modified with sulfonic acid groups preferably have a content of sulfonic acid groups in the range from 0.5 to 3 meq/g. This value is determined by means of the "ion exchange capacity" (IEC).

The IEC is measured by converting the sulfonic acid groups into the free acid. To this end, the polymer is treated in known manner with acid, any excess acid being removed by washing. The sulfonated polymer is accordingly initially treated for 2 hours in boiling water. Excess water is then blotted off and the sample dried for 15 hours at 160° C. in a vacuum drying cabinet at p<1 mbar. The dry weight of the membrane is then determined. The polymer dried in this manner is then dissolved in DMSO at 80° C. for 1 h. The solution is then titrated with 0.1 M NaOH. The ion exchange capacity (IEC) is then calculated from the quantity of acid consumed to reach the equivalence point and the dry weight.

Such polymers are known to those skilled in the art. Polymers containing sulfonic acid groups may accordingly be produced, for example, by sulfonating polymers. Method for sulfonating polymers are described in F. Kucera et. al. Polymer Engineering and Science 1988, Vol. 38, No. 5, 783-792. Sulfonation conditions may here be selected such that a low degree of sulfonation is obtained (DE-A-19959289).

A further class of non-fluorinated polymers has accordingly been developed by sulfonating high temperature resistant thermoplastics. Sulfonated polyether ketones (DE-A-4219077, WO96/01177), sulfonated polysulfones (J. Membr. Sci. 83 (1993) p. 211) or sulfonated polyphenylene sulfide (DE-A-19527435) are accordingly known.

U.S. Pat. No. 6,110,616 describes copolymers of butadiene and styrene and the subsequent sulfonation thereof for fuel cell use.

Such polymers may moreover also be obtained by polyreactions of monomers comprising acid groups. Perfluorinated polymers as described in U.S. Pat. No. 5,422,411 may accordingly be produced by copolymerisation from trifluorostyrene and sulfonyl-modified trifluorostyrene.

One such perfluorosulfonic acid polymer is inter alia Nafion° (U.S. Pat. No. 3,692,569). This polymer may be dissolved as described in U.S. Pat. No. 4,453,991 and then used as an ionomer.

Preferred polymers with acid groups include inter alia sulfonated polyether ketones, sulfonated polysulfones, sulfonated polyphenylene sulfides, perfluorinated polymers containing sulfonic acid groups, as described in U.S. Pat. No. 3,692,569, U.S. Pat. No. 5,422,411 and U.S. Pat. No. 6,110,616.

Polymers (B) which are preferred for use in fuel cells with a continuous service temperature of above 100° C. are those which have a glass transition temperature or Vicat softening temperature VSTIA/50 of at least 100° C., preferably of at least 150° C. and very particularly preferably of at least 180° C.

Polysulfones with a Vicat softening temperature VST/A/50 of 180° C. to 230° C. are here preferred.

Preferred polymers (B) are furthermore those which exhibit slight solubility and/or degradability in phosphoric acid. According to one particular embodiment of the present invention, treatment with 85% phosphoric acid brings about only insignificant weight loss. The weight ratio of the plate after phosphoric acid treatment to the weight of the plate before treatment is preferably greater than or equal to 0.8, in particular greater than or equal to 0.9 and particularly preferably greater than or equal to 0.95. This value is measured on a plate of polymer (B) which is 2 mm thick, 5 cm long and 2 cm wide. This plate is placed in phosphoric acid, the weight ratio of phosphoric acid to plate amounting to 10. The phosphoric acid is then heated to 100° C. with stirring for 24 hours. Any excess phosphoric acid is then removed from the plate by washing with water and the plate is dried. The plate is then reweighed.

Preferred polymers include polysulfones, in particular polysulfone with aromatic moieties in the main chain. According to one particular aspect of the present invention, preferred polysulfones and polyether sulfones exhibit a melt volume rate MVR 300/21.6, measured to 180 1133, of less than or equal to 40 cm$^3$/10 min, in particular of less than or equal to 30 cm$^3$/10 min and particularly preferably of less than or equal to 20 cm$^3$/10 min.

The mixture is polymerised by being heated to a temperature of up to 400° C., in particular of 350° C., preferably of up to 280° C., in particular of 100° C. to 250° C. and particularly preferably in the range from 200° C. to 250° C. An inert gas, for example nitrogen, or a noble gas, such as neon or argon, is used here.

Applicational properties may be further improved by also adding fillers, in particular proton-conducting fillers, and additional acids to the composition.

Non-limiting examples of proton-conducting fillers are
sulfates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$,
phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$,
polyacid such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$
selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$,
oxides such as $Al_2O_3$, $Sb_2O_5$, $ThO_2$, $SnO_2$, $ZrO_2$, $MoO_3$
silicates such as zeolites, zeolites($NH_4^+$), phyllosilicates, tectosilicates, H-natrolites, H-mordenites, $NH_4$-analcines, $NH_4$-sodalites, $NH_4$-gallates, H-montmorillonites
acids such as $HClO_4$, $SbF_5$
fillers such as carbides, in particular SiC, $Si_3N_4$, fibres, in particular glass fibres, glass powders and/or polymer fibres, preferably based on polyazoles.

These additives may be present in the composition in conventional quantities, but the positive properties of the membrane, such as elevated conductivity, long life span and elevated mechanical stability should not be impaired too much by adding excessively large quantities of additives. In general, the resultant membrane comprises at most 80 wt. %, preferably at most 50 wt. % and particularly preferably at most 20 wt. % of additives.

The composition may furthermore also contain perfluorinated sulfonic acid additives (preferably 0.1-20 wt. %, preferentially 0.2-15 wt. %, highly preferably 0.2-10 wt. %). These additives enhance performance, in the vicinity of the cathode increasing oxygen solubility and oxygen diffusion and reducing adsorption of phosphoric acid and phosphate onto platinum. (Electrolyte additives for phosphoric acid fuel cells. Gang, Xiao; Hjuler, H. A.; Olsen, C.; Berg, R. W.; Bjerrum, N.J. Chem. Dep. A, Tech, Univ. Denmark, Lyngby, Den. J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Non-limiting examples of persulfonated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, caesium nonafluorobutanesulfonate, triethylammonium perfluorohexanesulfonate, perfluorosulfoimides and Nafion.

In the method according to the invention, the composition containing polyphosphoric acid and at least one polyazole is pressed through a orifice, preferably a die. A die is a constantly forward tapering part through which the solution is passed.

The orifice is preferably of slot-shaped configuration and has an elongate, narrow, preferably rectangular shape. The width of the slot is preferably in the range from 10 cm to 2.0 m, particularly preferably in the range from 20 cm to 50 cm. The slot gap is favourably in the range from 250 μm to 5 mm, in particular in the range from 800 μm to 1600 μm. The ratio of slot width to slot gap is preferably in the range from 10:1 to 10000:1, particularly preferably in the range from 100:1 to 1000:1.

The method is carried out at a temperature, measured at the orifice, in the range from 25° C. to 300° C., preferably in the range from 120° C. to 180° C., particularly preferably in the range from 165° C. to 170° C.

The other method parameters may in principle be freely selected and adapted to the particular individual case. It has nevertheless proved particularly favourable to adjust the pressure at which the solution is pressed through the orifice to a value of at least 0.1 bar, preferably of at least 1.5 bar, in particular to a value in the range from 2 bar to 2.5 bar.

For the purposes of a very particularly preferred embodiment, the orifice is part of an extruder, through which the solution is extruded. It has proved very particularly effective to use single screw extruders or twin screw extruders in this connection.

It is furthermore very particularly favourable according to the invention to mix the polyazole and the polyphosphoric acid in the extruder. If the polyazole is to be produced in situ in the extruder, the extruder may comprise zones with different temperatures (synthesis zone, orifice). All that is essential is that the criteria according to the invention, i.e. the solution viscosity and the extrusion temperature at the orifice, are observed.

The composition pressed through the die is preferably applied onto a support, in particular onto an electrode. The extruded composition is then solidified.

For the purposes of a particularly preferred variant of the present invention, the composition is applied onto the support in such a manner that a plurality of non-interconnected fields of the composition is formed on the support. This may, for example, be achieved by pressing the composition through a divided gap or by interrupting application onto the support for a brief period and continuing at another point. One advantage of this procedure is inter alis the possibility of directly tailoring the shape of the membrane to requirements and avoiding subsequent cutting to size.

Solidification according to the invention of the extruded membrane proceeds by cooling, for example by air quenching, and/or a post-treatment (hydrolysis and/or crosslinking), preferably with a liquid or a liquid mixture, preferably in a dip bath containing the above-stated liquids.

The above-stated liquids adjust the temperature of the extruded membrane to a preselected temperature range, such that cooling and/or post-treatment (hydrolysis and/or crosslinking) may proceed over a preselected temperature profile.

The extruded membrane obtained by the method is preferably subjected to post-treatment with moisture, such that the polyphosphoric acid which is present is at least partially hydrolysed to form low molecular weight polyphosphoric acid and/or phosphoric acid. The membrane is preferably treated at temperatures in the range between $-100°$ C. and $150°$ C., preferably at temperatures between $10°$ C. and $120°$ C., in particular between room temperature ($20°$ C.) and $110°$ C., particularly preferably between $30°$ C. and $100°$ C. Treatment furthermore preferably proceeds under normal pressure, but may also proceed with exposure to pressure. For the purposes of a particularly preferred variant of the present invention, the membrane is passed through a bath which comprises water or aqueous liquids.

Hydrolysis of the polyphosphoric acid brings about solidification of the composition and a decrease in the film thickness and formation of a membrane. The solidified membrane generally has a thickness of between 15 and 3000 µm, preferably 20 and 2000 µm, in particular between 20 and 1500 µm, the membrane being self-supporting.

The upper temperature limit for moisture treatment is generally $150°$ C. In the case of extremely brief exposure to moisture, for example to superheated steam, said steam may also be hotter than $150°$ C. The upper temperature limit is substantially determined by the duration of the treatment.

Hydrolysis may also proceed in conditioning cabinets, in which hydrolysis may be purposefully controlled with defined exposure to moisture. The moisture content may here be adjusted by the temperature or saturation of the contacting environment, for example gases such as air, nitrogen, carbon dioxide or other suitable gases, or steam. Treatment time is dependent on the above-selected parameters.

Treatment time is furthermore dependent on the thickness of the membrane.

The treatment time generally amounts to between a few seconds to minutes, for example in the case of exposure to superheated steam, or up to whole days, for example in air at room temperature and low relative atmospheric humidity. The treatment time preferably amounts to between 10 seconds and 300 hours, in particular 1 minute to 200 hours.

If hydrolysis is performed at room temperature ($20°$ C.) with ambient air of a relative atmospheric humidity of 40-80%, the treatment time preferably amounts to between 1 and 200 hours.

The resultant membrane may be made self-supporting, i.e. it can be detached from the support without suffering damage and then optionally be directly further processed.

The concentration of phosphoric acid and thus the conductivity of the polymer membranes according to the invention may be adjusted by the degree of hydrolysis, i.e. duration, temperature and ambient humidity. According to the invention, the concentration of phosphoric acid is stated as mol of acid per mol of polymer repeat unit. For the purposes of the present invention, the concentration (mol of phosphoric acid relative to one repeat unit of the formula (III), i.e. polybenzimidazole) is between 10 and 90, in particular between 12 and 85, particularly preferably between 15 and 80, mol of phosphoric acid. Such high doping rates (concentrations) can be achieved only with great difficulty, if at all, by doping polyazoles with commercially obtainable orthophosphoric acid.

In a further embodiment of the invention, the liquids or liquid mixtures stated for post-treatment comprise those which enable hydrolysis of the polyphosphoric acid (hydrolysis liquid).

The extruded membrane is treated at the above-stated temperatures. In addition to water, the hydrolysis liquid also comprises at least one oxo acid of phosphorus and/or sulfur. In this case too, treatment preferably proceeds under normal pressure, but may also proceed with exposure to pressure.

The hydrolysis liquid may be a solution, the liquid possibly also containing suspended and/or dispersed constituents. The viscosity of the hydrolysis liquid may vary over wide ranges, it being possible to adjust the viscosity by adding solvents or increasing temperature. Dynamic viscosity is preferably in the range from 0.1 to 10000 mPa·s, in particular 0.2 to 2000 mPa·s, it being possible to measure these values, for example, according to DIN 53015.

Post-treatment may proceed by any known method. For example, the membrane may be immersed in a liquid bath or be sprayed with the hydrolysis liquid. The hydrolysis liquid may also be poured over the membrane.

Oxo acids of phosphorus and/or sulfur include in particular phosphinic acid, phosphonic acid, phosphoric acid, hypodiphosphonic acid, hypodiphosphoric acid, oligophosphoric acids, sulfurous acid, disulfurous acid and/or sulfuric acid. These acids may be used individually or as a mixture.

The oxo acids of phosphorus and/or sulfur moreover comprise free-radically polymerisable monomers comprising phosphonic acid and/or sulfonic acid groups. In this embodiment, the liquid, provided that it contains water, may effect hydrolysis and, on the other hand, effect solidification by subsequent polymerisation of the monomers. Providing that the post-treatment liquid also comprises compounds capable of crosslinking, solidification may also proceed by crosslinking.

Phosphonic acid groups comprising monomers are known to those skilled in the art. These are compounds which comprise at least one carbon-carbon double bond and at least one phosphonic acid group. The two carbon atoms which form the carbon-carbon double bond preferably comprise at least two, preferably 3, bonds to groups which result in low steric inhibition of the double bond. These groups include inter alia hydrogen atoms and halogen atoms, in particular fluorine atoms. For the purposes of the present invention, the polymer comprising phosphonic acid groups arises from the polymerisation product which is obtained by polymerisation of the monomer comprising phosphonic acid groups alone or with further monomers and/or crosslinking agents.

The monomer comprising phosphonic acid groups may comprise one, two, three or more carbon-carbon double bonds. The monomer comprising phosphonic acid groups may furthermore contain one, two, three or more phosphonic acid groups.

In general, the monomer comprising phosphonic acid groups contains 2 to 20, preferably 2 to 10 carbon atoms.

The monomer comprising phosphonic acid groups preferably comprises compounds of the formula

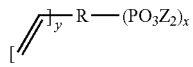

in which
R means a bond, a divalent C1-C15 alkylene group, divalent C1-C15 alkyleneoxy group, for example ethyleneoxy group or divalent C5-C20 aryl or heteroaryl group, wherein the above residues may in turn be substituted with halogen, —OH, COOZ, —CN, $NZ_2$,
Z mutually independently means hydrogen, C1-C15 alkyl group, C1-C15 alkoxy group, ethyleneoxy group or C5-C20 aryl or heteroaryl group, wherein the above residues may in turn be substituted with halogen, —OH, —CN, and
x means an integer 1, 2, 3, 4, 5, 6, 7, 8, 9 or 10
y means an integer 1, 2, 3, 4, 5, 6, 7, 8, 9 or 10
and/or of the formula

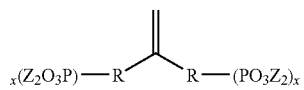

in which
R means a bond, a divalent C1-C15 alkylene group, divalent C1-C15 alkyleneoxy group, for example ethyleneoxy group or divalent C5-C20 aryl or heteroaryl group, wherein the above residues may in turn be substituted with halogen, —OH, COOZ, —CN, $NZ_2$,
Z mutually independently means hydrogen, C1-C15 alkyl group, C1-C15 alkoxy group, ethyleneoxy group or C5-C20 aryl or heteroaryl group, wherein the above residues may in turn be substituted with halogen, —OH, —CN, and
x means an integer 1, 2, 3, 4, 5, 6, 7, 8, 9 or 10
and/or of the formula

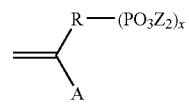

in which
A represents a group of the formulae $COOR^2$, CN, $CONR^2_2$, $OR^2$ and/or $R^2$, in which $R^2$ means hydrogen, a C1-C15 alkyl group, C1-C15 alkoxy group, ethyleneoxy group or C5-C20 aryl or heteroaryl group, wherein the above residues may in turn be substituted with halogen, —OH, COOZ, —CN, $NZ_2$
R means a bond, a divalent C1-C15 alkylene group, divalent C1-C15 alkyleneoxy group, for example ethyleneoxy group or divalent C5-C20 aryl or heteroaryl group, wherein the above residues may in turn be substituted with halogen, —OH, COOZ, —CN, $NZ_2$,
Z mutually independently means hydrogen, C1-C15 alkyl group, C1-C15 alkoxy group, ethyleneoxy group or C5-C20 aryl or heteroaryl group, wherein the above residues may in turn be substituted with halogen, —OH, —CN, and
x means an integer 1, 2, 3, 4, 5, 6, 7, 8, 9 or 10.

Preferred monomers comprising phosphonic acid groups include inter alia alkenes which comprise phosphonic acid groups, such as ethenephosphonic acid, propenephosphonic acid, butenephosphonic acid; acrylic acid and/or methacrylic acid compounds which comprise phosphonic acid groups, such as for example 2-phosphonomethylacrylic acid, 2-phosphonomethylmethacrylic acid, 2-phosphonomethylacrylamide and 2-phosphonomethylmethacrylamide.

Conventional commercial vinylphosphonic acid (ethenephosphonic acid), as is obtainable for example from Aldrich or Clariant GmbH, is particularly preferably used. A preferred vinylphosphonic acid exhibits a purity of greater than 70%, in particular 90% and particularly preferably greater than 97% purity.

The monomers comprising phosphonic acid groups may moreover also be used in the form of derivatives, which may then be converted into the acid, the conversion into the acid also possibly proceeding in the polymerised state. These derivatives include in particular the salts, esters, amides and halides of the monomers comprising phosphonic acid groups.

The monomers comprising phosphonic acid groups may moreover also be introduced onto and into the membrane after hydrolysis. This may proceed by means of per se known measures (for example spraying, dipping etc.) which are known from the prior art.

According to one particular aspect of the present invention, the ratio of the weight of the sum of phosphoric acid, polyphosphoric acid and the hydrolysis products of polyphosphoric acid to the weight of the free-radically polymerisable monomers, for example of the monomers comprising phosphonic acid groups, is preferably greater than or equal 1:2, in particular greater than or equal 1:1. and particularly preferably greater than or equal 2:1.

The ratio of the weight of the sum of phosphoric acid, polyphosphoric acid and the hydrolysis products of polyphosphoric acid to the weight of the free-radically polymerisable monomers is in the range from 1000:1 to 3:1, in particular 100:1 to 5:1 and particularly preferably 50:1 to 10:1.

This ratio may readily be determined by conventional methods, it often being possible to wash the phosphoric acid, polyphosphoric acid and the hydrolysis products thereof out of the membrane. The weight of the polyphosphoric acid and the hydrolysis products thereof after complete hydrolysis may here be related to the phosphoric acid. This generally likewise applies to the free-radically polymerisable monomers.

Monomers comprising sulfonic acid groups are known to those skilled in the art. These are compounds which comprise at least one carbon-carbon double bond and at least one sulfonic acid group. The two carbon atoms which form the carbon-carbon double bond preferably comprise at least two, preferably 3, bonds to groups which result in low steric inhibition of the double bond. These groups include inter alia hydrogen atoms and halogen atoms, in particular fluorine atoms. For the purposes of the present invention, the polymer comprising sulfonic acid groups arises from the polymerisation product which is obtained by polymerisation of the monomer containing sulfonic acid groups alone or with further monomers and/or crosslinking agents.

The monomer comprising sulfonic acid groups may comprise one, two, three or more carbon-carbon double bonds. The monomer comprising sulfonic acid groups may furthermore contain one, two, three or more sulfonic acid groups.

In general, the monomer comprising sulfonic acid groups contains 2 to 20, preferably 2 to 10 carbon atoms.

The monomer comprising sulfonic acid groups preferably comprises compounds of the formula

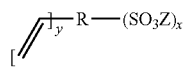

in which
R means a bond, a divalent C1-C15 alkylene group, divalent C1-C15 alkyleneoxy group, for example ethyleneoxy group or divalent C5-C20 aryl or heteroaryl group, wherein the above residues may in turn be substituted with halogen, —OH, COOZ, —CN, $NZ_2$,
Z mutually independently means hydrogen, C1-C15 alkyl group, C1-C15 alkoxy group, ethyleneoxy group or C5-C20 aryl or heteroaryl group, wherein the above residues may in turn be substituted with halogen, —OH, —CN, and
x means an integer 1, 2, 3, 4, 5, 6, 7, 8, 9 or 10
y means an integer 1, 2, 3, 4, 5, 6, 7, 8, 9 or 10
and/or of the formula

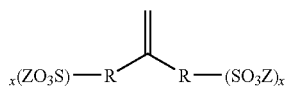

in which
R means a bond, a divalent C1-C15 alkylene group, divalent C1-C15 alkyleneoxy group, for example ethyleneoxy group or divalent C5-C20 aryl or heteroaryl group, wherein the above residues may in turn be substituted with halogen, —OH, COOZ, —CN, $NZ_2$,
Z mutually independently means hydrogen, C1-C15 alkyl group, C1-C15 alkoxy group, ethyleneoxy group or C5-C20 aryl or heteroaryl group, wherein the above residues may in turn be substituted with halogen, —OH, —CN, and
x means an integer 1, 2, 3, 4, 5, 6, 7, 8, 9 or 10
and/or of the formula

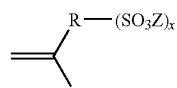

in which
A represents a group of the formulae $COOR^2$, CN, $CONR^2_2$, $OR^2$ and/or $R^2$, in which $R^2$ means hydrogen, a C1-C15 alkyl group, C1-C15 alkoxy group, ethyleneoxy group or C5-C20 aryl or heteroaryl group, wherein the above residues may in turn be substituted with halogen, —OH, COOZ, —CN, $NZ_2$
R means a bond, a divalent C1-C15 alkylene group, divalent C1-C15 alkyleneoxy group, for example ethyleneoxy group or divalent C5-C20 aryl or heteroaryl group, wherein the above residues may in turn be substituted with halogen, —OH, COOZ, —CN, $NZ_2$,
Z mutually independently means hydrogen, C1-C15 alkyl group, C1-C15 alkoxy group, ethyleneoxy group or C5-C20 aryl or heteroaryl group, wherein the above residues may in turn be substituted with halogen, —OH, —CN, and
x means an integer 1, 2, 3, 4, 5, 6, 7, 8, 9 or 10.

Preferred monomers comprising sulfonic acid groups inter alia include alkenes which comprise sulfonic acid groups, such as ethenesulfonic acid, propenesulfonic acid, butenesulfonic acid; acrylic acid and/or methacrylic acid compounds which comprise sulfonic acid groups, such as for example 2-sulfonomethylacrylic acid, 2-sulfonomethylmethacrylic acid, 2-sulfonomethylacrylamide and 2-sulfonomethylmethacrylamide.

Conventional commercial vinylsulfonic acid (ethenesulfonic acid), as is obtainable for example from Aldrich or Clariant GmbH, is particularly preferably used. A preferred vinylsulfonic acid exhibits a purity of greater than 70%, in particular 90% and particularly preferably greater than 97% purity.

The monomers comprising sulfonic acid groups may moreover also be used in the form of derivatives, which may then be converted into the acid, the conversion into the acid also possibly proceeding in the polymerised state. These derivatives include in particular the salts, esters, amides and halides of the monomers comprising sulfonic acid groups.

The monomers comprising sulfonic acid groups may moreover also be introduced onto and into the membrane after hydrolysis. This may proceed by means of per se known measures (for example spraying, dipping etc.) which are known from the prior art.

In a further embodiment of the invention, monomers capable of crosslinking may be used. These monomers may be added to the hydrolysis liquid. The monomers capable of crosslinking may furthermore also be applied onto the membrane obtained after hydrolysis.

The monomers capable of crosslinking are in particular compounds which comprises at least 2 carbon-carbon double bonds. Preferred monomers are dienes, trienes, tetraenes, dimethyl acrylates, trimethyl acrylates, tetramethyl acrylates, diacrylates, triacrylates, tetraacrylates.

Particularly preferred monomers are dienes, trienes, tetraenes of the formula

dimethyl acrylates, trimethyl acrylates, tetramethyl acrylates of the formula

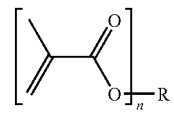

diacrylates, triacrylates, tetraacrylates of the formula

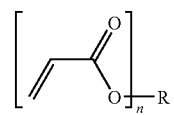

in which
R means a C1-C15 alkyl group, C5-C20 aryl or heteroaryl group, NR', —$SO_2$, PR', $Si(R)_2$, wherein the above residues may in turn be substituted, R' mutually independently means hydrogen, a C1-C15 alkyl group, C1-C15 alkoxy group, C5-C20 aryl or heteroaryl group and n is at least 2.

The substituents of the above residue R preferably comprise halogen, hydroxyl, carboxy, carboxyl, carboxyl ester, nitrile, amine, silyl, siloxane residues.

Particularly preferred crosslinking agents are allyl methacrylate, ethylene glycol dimethacrylate, diethylene glycol dimethacrylate, triethylene glycol dimethacrylate, tetra- and polyethylene glycol dimethacrylate, 1,3-butanediol dimethacrylate, glycerol dimethacrylate, diurethane dimethacrylate, trimethylpropane trimethacrylate, epoxy acrylates, for example Ebacryl, N',N-methylenebisacrylamide, carbinol, butadiene, isoprene, chloroprene, divinylbenzene and/or bisphenol-A dimethyl acrylate. These compounds are commercially obtainable for example from Sartomer Company Exton, Pa. under the names CN-120, $CN_{104}$ and CN-980.

The use of crosslinking agents is optional, wherein these compounds may conventionally be used in the range between 0.05 to 30 wt. %, preferably 0.1 to 20 wt. %, particularly preferably 1 and 10 wt. %, relative to the weight of the membrane.

The crosslinking monomers may also be applied by spraying etc.

According to one particular aspect of the present invention, the monomers comprising phosphoric acid and/or sulfonic acid groups or the crosslinking monomers be polymerised, wherein polymerisation preferably proceeds free-radically. Free-radical formation may proceed thermally, photochemically, chemically and/or electrochemically.

A starter solution which contains at least one substance capable of forming free radicals may be added to the hydrolysis liquid. A starter solution may moreover be applied onto the membrane after hydrolysis. This may proceed by means of per se known measures (for example spraying, dipping etc.) which are known from the prior art.

Suitable free-radical formers are inter alia azo compounds, peroxy compounds, persulfate compounds or azoamidines. Non-limiting examples are dibenzoyl peroxide, dicumene peroxide, cumene hydroperoxide, diisopropyl peroxydicarbonate, bis(4-t-butylcyclohexyl)peroxydicarbonate, dipotassium persulfate, ammonium peroxydisulfate, 2,2'-azobis(2-methylpropionitrile) (AIBN), 2,2'-azobis-(isobutyric acid amidine) hydrochloride, benzopinacole, dibenzyl derivatives, methyl ethylene ketone peroxide, 1,1-azobiscyclohexanecarbonitrile, methyl ethyl ketone peroxide, acetylacetone peroxide, dilauryl peroxide, didecanoyl peroxide, tert.-butyl per-2-ethylhexanoate, ketone peroxide, methyl isobutyl ketone peroxide, cyclohexanone peroxide, dibenzoyl peroxide, tert.-butyl peroxybenzoate, tert.-butylperoxyisopropyl carbonate, 2,5-bis(2-ethylhexanoylperoxy)-2,5-dimethylhexane, tert.-butylperoxy-2-ethylhexanoate, tent.-butylperoxy-3,5,5-trimethylhexanoate, tert.-butylperoxyisobutyrate, tert.-butylperoxyacetate, dicumyl peroxide, 1,1-bis(tert.-butylperoxy)-cyclohexane, 1,1-bis(tert.-butylperoxy)-3,3,5-trimethylcyclohexane, cumyl hydroperoxide, tert.-butyl hydroperoxide, bis(4-tert.-butylcyclohexyl) peroxydicarbonate, and the free-radical formers obtainable from DuPont under the name ®Vazo, for example ®Vazo V50 and ®Vazo WS.

It is moreover also possible to use free-radical formers which form free radicals on irradiation. Preferred compounds include inter alia α,α-diethoxyacetophenone (DEAP, Upjon Corp), n-butyl benzoin ether (®Trigonal-14, AKZQ) and 2,2-dimethoxy-2-phenylacetophenone (®Igacure 651) and 1-benzoylcyclohexanol (®Igacure 184), Bis(2,4,6-trimethylbenzoyl)phenylphosphine oxide (®Irgacure 819) and 1-[4-(2-hydroxyethoxy)phenyl]-2-hydroxy-2-phenyl propan-1-one (®Irgacure 2959), which are in each case commercially obtainable from Ciba Geigy Corp.

Conventionally, between 0.0001 and 5 wt. %, in particular 0.01 to 3 wt. % (relative to the weight of the free-radically polymerisable monomers; monomers comprising phosphonic acid and/or sulfonic acid groups or the crosslinking monomers) of free-radical former is added. The quantity of free-radical former may be varied depending on desired degree of polymerisation.

Polymerisation may also proceed by exposure to IR or NIR (IR=infrared, i.e. light with a wavelength of greater than 700 nm; NIR=near IR, i.e. light with a wavelength in the range from approx. 700 to 2000 nm or with an energy in the range from approx. 0.6 to 1.75 eV).

The polymerisation may also proceed by exposure to UV light with a wavelength of less than 400 nm. This polymerisation method is per se known and described, for example, in Hans Joerg Elias, Makromolekulare Chemie, 5th edition, volume 1, pp. 492-511; D. R. Arnold, N. C. Baird, J. R. Bolton, J. C. D. Brand, P. W. M Jacobs, P. de Mayo, W. R. Ware, Photochemistry—An Introduction, Academic Press, New York and M. K. Mishra, Radical Photopolymerization of Vinyl Monomers, J. Macromol. Sci.-Revs. Macromol. Chem. Phys. C22(1982-1983) 409.

Polymerisation may also be achieved by exposure to β, γ and/or electron beam radiation. According one particular embodiment of the present invention, a membrane is irradiated with a radiation dose in the range from 1 to 300 kGy, preferably from 3 to 200 kGy and very particularly preferably from 20 to 100 kGy.

Polymerisation of the monomers comprising phosphonic acid and/or sulfonic acid groups or of the crosslinking monomers preferably proceeds at temperatures above room temperature (20° C.) and less than 200° C., in particular at temperatures between 40° C. and 150° C., particularly preferably between 50° C. and 120° C. Polymerisation preferably proceeds under normal pressure, but may also proceed with exposure to pressure. Polymerisation leads to solidification of the planar structure, it being possible to monitor this solidification by measurement of microhardness. The increase in hardness brought about by polymerisation preferably amounts to at least 20%, relative to the hardness of the planar structure obtained in step B).

According to one particular aspect of the present invention, the molar ratio of the molar sum of phosphoric acid, polyphosphoric acid and the hydrolysis products of polyphosphoric acid to the number of moles of phosphonic acid groups and/or sulfonic acid groups in the polymers obtainable by polymerisation of monomers comprising phosphonic acid groups and/or monomers comprising sulfonic acid groups is preferably greater than or equal 1:2, in particular greater than or equal 1:1. and particularly preferably greater than or equal 2:1.

The molar ratio of the molar sum of phosphoric acid, polyphosphoric acid and the hydrolysis products of the polyphosphoric acid to the number of moles of phosphonic acid groups and/or sulfonic acid groups in the polymers obtainable by polymerisation of monomers comprising phosphonic acid groups and/or monomers comprising sulfonic acid groups is in the range from 1000:1 to 3:1, in particular 100:1 to 5:1 and particularly preferably 50:1 to 10:1.

The molar ratio may be determined using conventional methods. Spectroscopic methods, for example NMR spectroscopy, may in particular be used for this purpose. It must be borne in mind that the phosphonic acid groups are present in the formal oxidation number 3 and the phosphorus in phosphoric acid, polyphosphoric acid or the hydrolysis products thereof is present in the oxidation number 5.

Depending on the desired degree of polymerisation, the planar structure which is obtained after polymerisation is a self-supporting membrane. The degree of polymerisation preferably amounts to at least 2, in particular at least 5, particularly preferably at least 30 repeat units, in particular at least 50 repeat units, very particularly preferably at least 100 repeat units. This degree of polymerisation is determined from the number-average molecular weight $M_n$, which may be determined by GPC method. Due to the problems of isolating the polymers containing phosphonic acid groups which are contained in the membrane without degradation, this value is determined by making use of a sample which is prepared by polymerising monomers comprising phosphonic acid groups without addition of polymer. The proportion by weight of monomers comprising phosphonic acid groups and of free-radical starter is here kept constant in comparison with the ratios for production of the membrane. The degree of conversion which is achieved in a comparison polymerisation is preferably greater than or equal 20%, in particular greater than or equal 40% and particularly preferably greater than or equal 75%, relative to the introduced monomers comprising phosphonic acid groups.

The hydrolysis liquid comprises water, the concentration of the water not generally being particularly critical. According to one particular aspect of the present invention, the hydrolysis liquid comprises 5 to 80 wt. %, preferably 8 to 70 wt. % and particularly preferably 10 to 50 wt. % water. The quantity of water which is formally present in the oxo acids is not taken into account in the water content of the hydrolysis liquid.

Of the above-stated acids, phosphoric acid and/or sulfuric acid are particularly preferred, these acids in particular comprising 5 to 70 wt. %, preferably 10 to 60 wt. % and particularly preferably 15 to 50 wt. % water.

Subsequent to the moisture treatment, the membrane may be further crosslinked by exposure to heat in the presence of oxygen. This curing of the membrane additionally improves the properties of the membrane. The membrane may be heated to a temperature of at least 150° C., preferably at least 200° C. and particularly preferably at least 250° C. The oxygen concentration in this method step is conventionally in the range from 5 to 50 vol. %, preferably 10 to 40 vol. %, without this being intended to constitute a limitation. This crosslinking too may also proceed by exposure to IR or NIR (IR=infrared, i.e. light with a wavelength of greater than 700 nm; NIR=near IR, i.e. light with a wavelength in the range from approx. 700 to 2000 nm or with an energy in the range from approx. 0.6 to 1.75 eV). A further method is irradiation with β radiation. The radiation dose here amounts to between 5 and 200 kGy.

Depending on the desired degree of crosslinking, the duration of the crosslinking reaction may vary widely. In general, this reaction time is in the range from 1 second to 10 hours, preferably 1 minute to 1 hour, without this being intended to constitute a limitation.

The method according to the invention permits comparatively simple and inexpensive production of acid-doped, polyazole-containing membranes, which method can readily be scaled up to a large industrial scale. The following advantages may in particular be achieved by the approach according to the invention:

distinctly less, usually no, solvent is required for production of the membranes, production of the membranes may proceed with a distinctly better space-time yield, membranes with comparatively high quality and reproducibility are obtained with virtually no fluctuations in quality between different batches being observed, it is now possible to process polyazoles with comparatively high molecular weights and the formation of bubbles in the membrane is virtually completely prevented.

Fields of application of the membranes obtainable by the method according to the invention in particular include the use thereof as a polymer electrolyte membrane in fuel cells. Further details may be found by referring to documents DE 102 13 540 A1, DE 102 46 559 A1 and DE 102 46 461 A1, the disclosure of which is hereby incorporated by reference.

The invention claimed is:

1. A method for producing a proton-conducting, polyazole-containing membrane which comprises
    A) extruding a composition containing 70 wt. % to 99.5 wt. % of polyphosphoric acid and 0.5 wt, % to 30 wt. % of at least one polyazole through a slot, said composition and exhibiting a solution viscosity in the range from 10 Pas to 1000 Pa·s, measured to DIN 53018 at the temperature at the slot, said temperature being in the range from 120° C. to 300° C. during production of the membrane, and
    B) solidifying the composition through cooling and/or hydrolysis and/or cross-linking.

2. The method according to claim 1, wherein the composition is pressed through the orifice at a temperature in the range from 120° C. to 180° C.

3. The method according to claim 1, wherein the composition is used which exhibits a solution viscosity in the range from 20 Pa·s to 800 Pa·s, measured to DIN 53018 at the temperature at the orifice during production of the membrane.

4. The method according to claim 1, wherein the composition is used which contains at least one polyazole with an intrinsic viscosity, measured in at least 96 wt. % sulfuric acid, in the range from 0.3 to 10 dl/g.

5. The method according to claim 1, wherein the composition is pressed through the orifice which, in each case relative to the total weight thereof, contains 95.0 wt. % to 99.5 wt. % of polyphosphoric acid and 0.5 wt. % to 5.0 wt. % of polyazole.

6. The method according to claim 1, wherein the slot has a slot width in the range from 20 cm to 50 cm.

7. The method according to claim 1, wherein the slot has a slot gap in the range from 800 μm to 1600 μm.

8. The method according to claim 1, wherein the slot has a ratio of slot width to slot gap in the range from 100:1 to 1000:1.

9. The method according to claim 1, wherein the composition is pressed through the slot with a pressure of at least 0.1 bar.

10. The method according to claim 5, wherein the polyphosphoric acid and the polyazole are mixed in an extruder.

11. The method according to claim 1, wherein the polyazole is produced in situ
    a) by reacting one or more aromatic and/or heteroaromatic tetra-amino compounds with one or more aromatic and/or heteroaromatic carboxylic acids or the derivatives thereof, which contain at least two acid groups per carboxylic acid monomer, or
    b) by reacting one or more aromatic and/or heteroaromatic diaminocarboxylic acids.

12. The method according to claim 1, wherein the polyazole comprises at least one phosphonic acid group.

13. The method according to claim 1, wherein the composition is applied onto a support.

14. The method according to claim 13, wherein a plurality of non-interconnected fields of the composition are applied onto the support.

15. The method according to claim 1, wherein the composition is solidified by treating it with moisture.

16. The method according to claim 1, wherein a composition is used which contains at least one polymer which differs from polyazole.

* * * * *